United States Patent [19]

Alcorn

[11] Patent Number: 5,018,547

[45] Date of Patent: May 28, 1991

[54] PRESSURE ACTUATED VALVE

[76] Inventor: Arlo S. Alcorn, 2681 S. Kamas Dr., Salt Lake City, Utah 84118

[21] Appl. No.: 516,163

[22] Filed: Apr. 30, 1990

[51] Int. Cl.[5] .......... F16K 17/04

[52] U.S. Cl. .......... 137/111; 137/101.11; 137/538

[58] Field of Search .......... 137/101.11, 111, 114, 137/538

[56] References Cited

U.S. PATENT DOCUMENTS

| | | | |
|---|---|---|---|
| 1,172,527 | 2/1916 | Hill | 137/111 |
| 1,303,762 | 5/1919 | Bradford | 137/111 |
| 2,011,333 | 8/1935 | Clifton | 137/538 |
| 2,655,173 | 10/1953 | Overbeke | 137/538 X |
| 3,974,847 | 8/1976 | Hodges | 137/101.11 |

*Primary Examiner*—Robert G. Nilson

[57] ABSTRACT

A pressure actuated valve is normally closed by the action of an externally manually adjustable spring that acts against the back side of the valve element. The valve element surface opposite that of the adjustment spring is exposed to a first port in the valve body, which first port is connected to a primary fluid flow line. At a location on the valve body there may be one or more side ports that communicate with the interior of the valve body in which pressure at side port/s will not affect the valve element. When flowing fluid back pressure is exposed to the valve element at the first port, said pressure overcomes the spring force and opens the valve element. Wherein it exposes a pressurized fluid/s to the valve interior through one or more side ports that will then establish a communication to the first port. Metered high pressure fluid/s then flow into the side port/s, forced through the valve and into the primary flowing fluid that created the initial back pressure to open the valve. This metered fluid is maintained at a pressure sufficient to overcome the flowing primary fluid back pressure, allowing this metered fluid to be introduced into the primary flowing fluid, but is sufficiently low that the back pressure of the metered fluid/s, alone, will not maintain the valve in the open position. When the primary fluid flow ceases, the valve element will close and isolate the side port/s and metered fluid/s.

4 Claims, 3 Drawing Sheets

PRESSURE ACTUATED VALVE

BACKGROUND OF THE INVENTION

1. Field of the Invention

The present invention pertains to a pressure actuated valve, and more particularly to such a valve for use in a system for introducing a treatment fluid under pressure into a primary fluid flow line operating at a lesser pressure, for distribution into the primary fluid flow line.

2. Description of the Prior Art

In systems wherein it is desired to feed or otherwise introduce a treatment fluid, for example, into a primary fluid flow line (water, for example), it has been common practice to utilize a pump to pump the treatment fluid into the primary fluid flow line. Such a pump is generally electrically operated, and actuated by a pressure sensitive switch in line with the flowing fluid such that, depending on the particular configuration, the pressure actuated switch will activate the electric pump upon the occurrence of a predetermined high or low fluid pressure in the primary fluid flow line.

Another system that is used, although not as common, is a venturi system for metering or otherwise introducing the treatment fluid into the primary fluid flow line. A drawback of the venturi system for introducing treatment fluids is that the venturi should preferably be positioned at the fluid flow exit to atmosphere, rather than remote of the exit or nozzle within the fluid flow line prior to discharge.

SUMMARY OF THE INVENTION

The present invention takes the form of a pressure actuated piston type valve that is normally closed by the action of an externally manually adjustable spring mechanism acting on the piston to urge the piston closed. The valve element pressure surface opposite that of the adjustment spring is exposed to a first port in the valve body which is connected to a primary fluid flow line. As long as the pressure in the primary fluid flow line remains under a predetermined level, the spring force will maintain the valve element in its closed position. A second port communicates with the interior of the valve body at a location on the side of the valve element when the valve element is in its closed position, such that pressure acting at the second port will not affect the position or movement of the valve element.

In use, fluid pressure at the second port is always greater than the maximum fluid pressure at the first port. When fluid pressure in the primary fluid flow line (which acts at the first port on the pressure surface opposite the spring) is sufficient to overcome the force of the spring, such increased fluid pressure at the primary fluid flow line will open the valve, causing fluid flow from the higher pressure fluid supply at the second port to flow through the valve and out the first port into the fluid flow line. This steady-state condition is maintained so long as the combined fluid pressure within the valve interior is greater than the force of the spring acting on the back side of the valve element. This combined fluid pressure is provided by the high pressure fluid supply at the second port in combination with the back pressure of the flowing fluid acting at the first port. When the primary fluid flow stops, pressure acting at the first port drops below the predetermined level. The force of the spring then overcomes the force of such decreased fluid pressure and closes the valve, interrupting communication between the high pressure fluid at the valve second port and the valve first port. In this regard, the fluid flow into the valve at the second port is metered before entering the second port, in order to decrease the flow rate into the valve and regulate the metered flow fluid pressure so that the metered flow fluid pressure does not keep the valve open inadvertently.

DETAILED DESCRIPTION OF THE INVENTION

Figure 1:
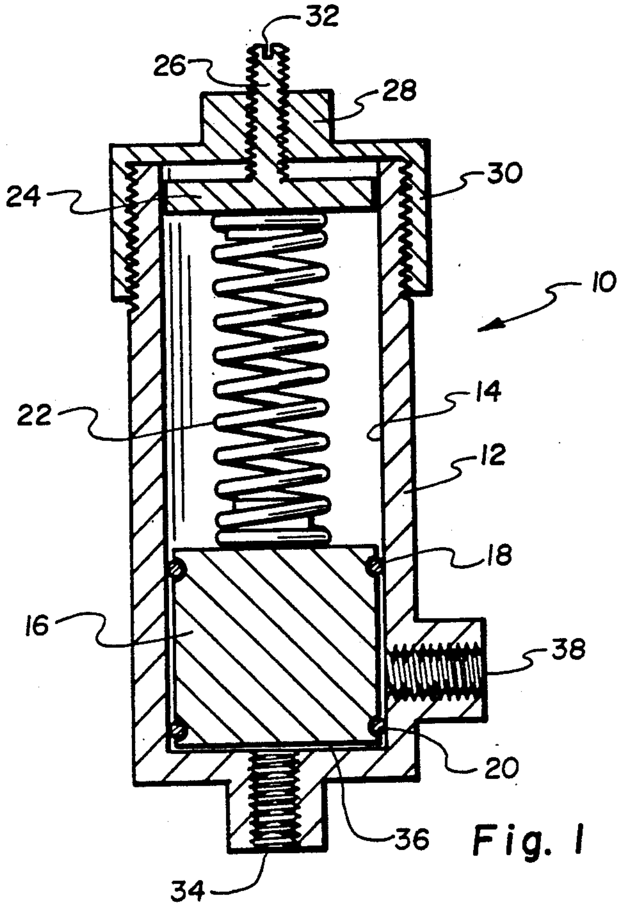
FIG. 1 is a cross-sectional view of the pressure actuated valve of the present invention, showing the valve element in its closed position.
Figure 2:
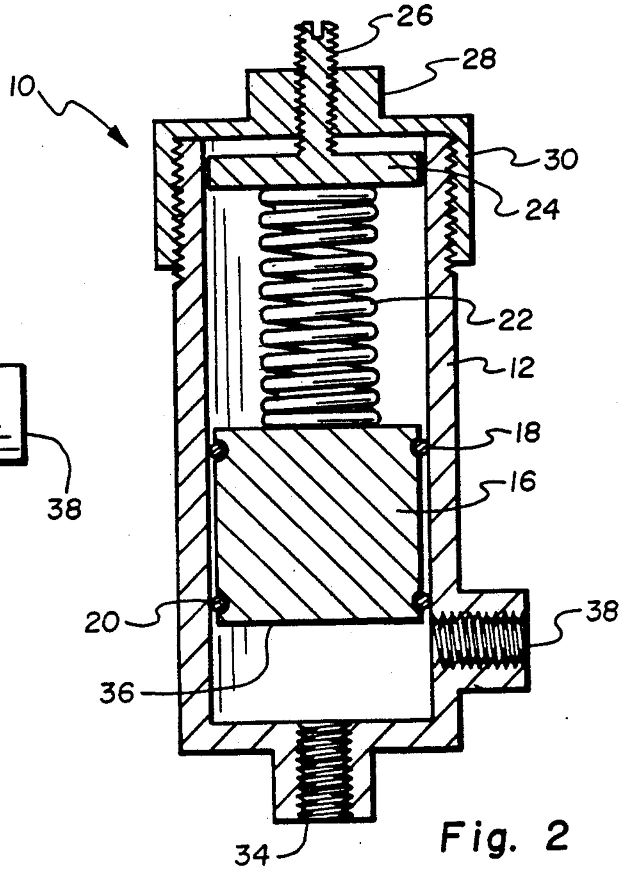
FIG. 2 is a cross-sectional view essentially identical to FIG. 1, showing the valve element in its open position.

Turning now to the drawings, and initially to FIGS. 1 and 2, the pressure actuated valve of the present invention in shown at 10 in vertical cross-section for clarity of explanation of construction and operation. The pressure actuated valve 10 comprises a valve body 12 defining an internal bore 14 therein, in which is positioned a valve element 16 for movement between a closed position shown in FIG. 1 and an open position shown in FIG. 2. The valve element 16 includes upper and lower 0-ring seals 18, 20, respectively, for sealing the valve element against the valve body internal bore 14 in a customary fashion.

The valve element 16 is retained in its normally closed position (FIG. 1) by the action of a compression spring 22 acting on the "back side" of the valve element to urge the valve element toward its closed position (in a downward direction in FIG. 1). At the upper end of the spring opposite the valve element, the spring 22 engages a plate 24 of a spring compression adjustment mechanism. The plate 24 is formed with or otherwise connected to a threaded shaft 26 which threadedly engages an annular boss 28 of a valve body end cap 30. As shown, the end cap 30 is attachable to the valve body 12 by mating threads in a customary fashion. The adjustment mechanism threaded shaft 26 also includes a diagonal slot 32 for external manual adjustment of the opening pressure of the valve with a screwdriver.

The body of the valve shown in cross-section in FIGS. 1 and 2 includes a first port 34 in direct communication with the valve interior and with a fluid pressure surface 36 of the valve element 16. The valve body also includes a second port 38 which communicates with the valve interior and with the side of the valve element 16 when the valve element is in its closed position shown in FIG. 1.

Those skilled in the art will appreciate that the valve 10 of the present invention is actuated (opened) by fluid pressure acting at the first port 34 sufficient to overcome the compressive force of the spring 22. In this regard, the compression spring adjustment mechanism plate and threaded shaft 24, 26 cooperate with the valve body end cap 30 to permit external manual adjustment of the compression spring force, and therefore external manual adjustment of the pressure acting at the first port 34 which will cause the valve to open, as shown in FIG. 2. Those skilled in the art will also readily appreciate that the pressure actuated valve of the present invention will remain in its open position (FIG. 2) as long as there is sufficient fluid flow back pressure force at the first port 34 created by the flowing fluid.

Figure 3:
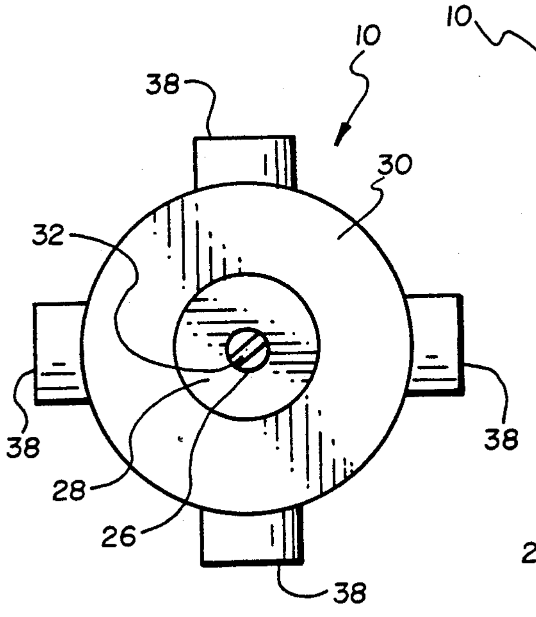
FIG. 3 is a top view of a valve similar to that shown in FIGS. 1 and 2, showing typical locations of a plurality of side ports similar to the one shown in FIGS. 1 and 2.

It is intended that the pressure actuated valve of the present invention be used to introduce one or more separate treatment-type fluids into a primary fluid supply line, connected to the valve at the first port 34, when sufficient flowing fluid back pressure within the primary fluid supply line reaches a predetermined minimum value. In this regard, FIG. 3 illustrates that the valve body 12 may include a plurality of inlet ports similar to the second port 38 shown in FIGS. 1 and 2. In this manner, a number of treatment fluids (diluted chemicals, fertilizers, etc.) may be simultaneously introduced into the primary fluid supply line.

Figure 4:
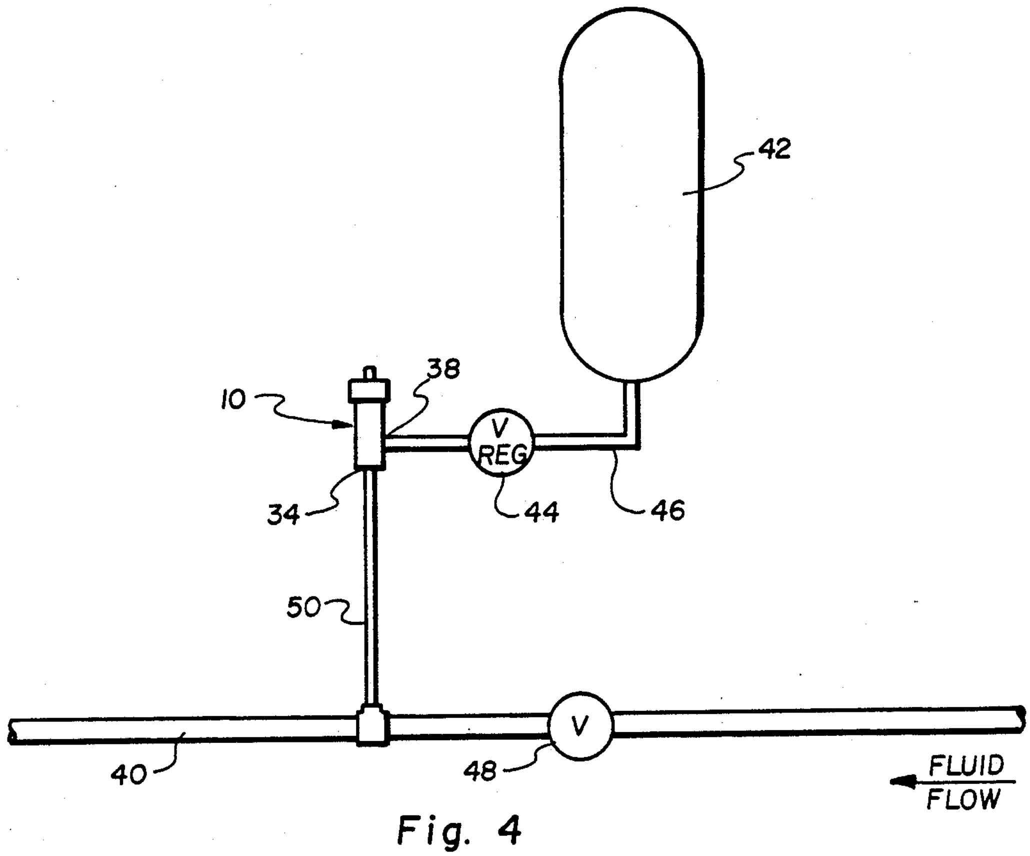
FIG. 4 is a schematic diagram of a system utilizing the pressure actuated valve of the present invention for introducing a treatment fluid contained in a pressurized tank into a primary fluid supply line.

FIG. 4 is a schematic diagram of a fluid delivery system utilizing the pressure actuated valve 10 of the present invention. The first port 34 of the valve 10 is in communication with a variable pressure primary fluid supply line 40, such as a main water line or the like. The second port 38 is in communication with a vessel or tank 42 of a treatment fluid to be supplied to the variable pressure primary fluid supply line 40. This tank 42 of treatment fluid is pressurized, and is maintained at a pressure that is always greater than any maximum pressure that would occur within the variable pressure primary fluid supply line 40. In this regard, a fluid pressure regulator 44 may be provided in the supply line 46 interconnecting the pressurized treatment fluid tank 42 and the pressure actuated valve 10.

The fluid delivery system of FIG. 4 operates as follows. Pressurized fluid is generally always present in the variable pressure primary fluid supply line 40, at least upstream of an on/off valve 48. Likewise, the treatment fluid contained in the tank 42 is always maintained at a pressure higher than any maximum pressure contained in the variable pressure primary fluid supply line 40. Initially, with either no fluid pressure or insufficient fluid pressure downstream of the valve 48, the pressure actuated valve 10 is maintained in its closed position by action of the compression force of the internal compression spring 22. Upon opening of the valve 48, flowing fluid back pressure is realized at the first port 34 of the valve 10. When this fluid back pressure at the first port 34 (which acts directly upon the valve element fluid pressure surface 36) is sufficient to overcome the force of the spring 22, it will do so, lifting the valve element 16 and exposing the valve second port 38 to communication with the interior 14 of the valve body. With the valve element 16 opening communication between the second and first ports 38 and 34, the greater fluid pressure contained in the treatment fluid pressurized tank 42 causes an immediate reversal of fluid flow from the valve 10 through the connecting pipe 50, and into the variable pressure primary fluid supply line 40. As previously stated, as long as sufficient flowing fluid back pressure is maintained within the system, (and specifically acting upon the valve element fluid pressure surface 36 at the first port 34), the pressure actuated valve 10 will remain open, continuously feeding treatment fluid from the tank 42 through the valve 10 and into the primary fluid supply line 40.

Figure 5:
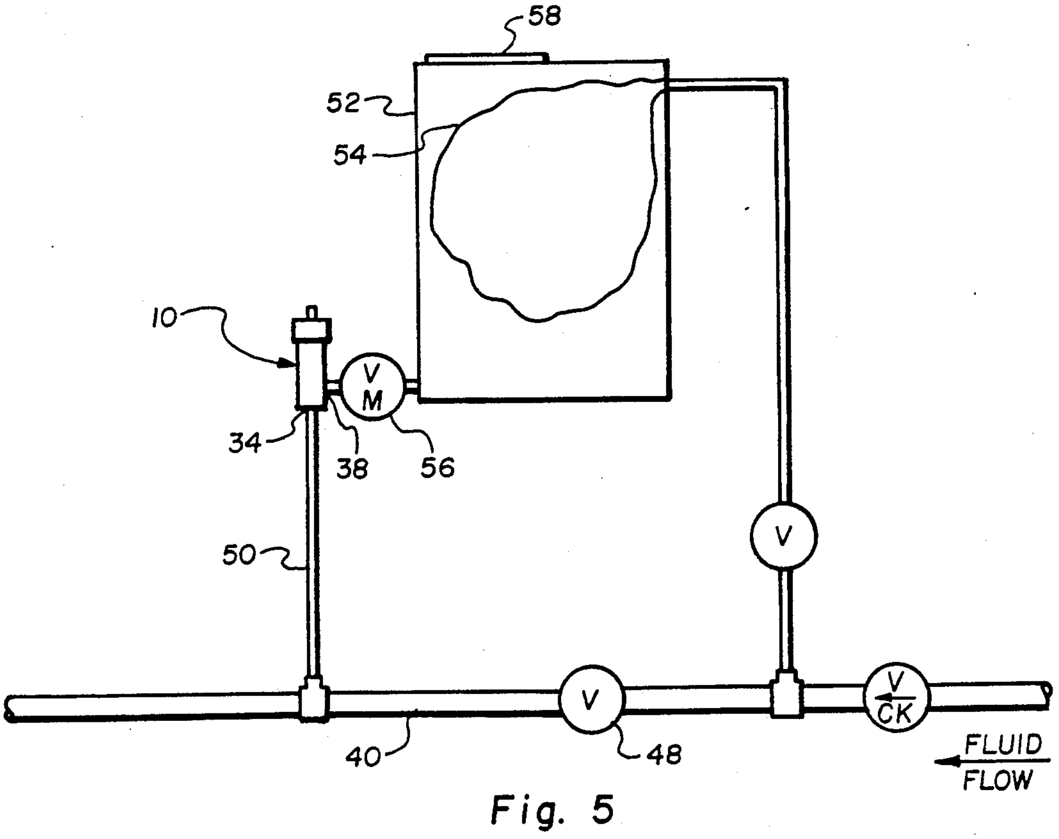
FIG. 5 is a schematic diagram of an alternative system for introducing a treatment fluid into a primary fluid supply line, such system utilizing fluid pressure in the primary fluid supply line through a bladder-type tank for supplying pressurized treatment fluid to the valve for introduction into the primary fluid supply line.

FIG. 5 is a schematic diagram of a system similar to that shown in FIG. 4, that functions essentially in the same manner as the system shown in FIG. 4. The pressure actuated valve 10 is connected by connecting pipe 50 to the variable pressure primary fluid supply line 40. Likewise, the valve 10 is connected to a pressurized tank or vessel 52 for supplying treatment fluid (i.e., liquid chemical) through the valve 10 and into the primary fluid supply line 40. In the device of FIG. 5, however, the pressurization of the pressurized tank 52 is provided by the primary fluid supply line 40, upstream of the on/off valve 48. In this manner, the pressure acting to pressurize the tank 52 is always greater than the pressure in the primary fluid supply line 40 downstream of the on/off valve 48. This is because, in any flowing fluid system, upstream pressure is always greater than downstream pressure.

In order to prevent contamination or otherwise mixing of the fluid flowing in the variable pressure primary fluid supply line 40 and the treatment fluid (e.g., liquid chemical) in the tank 52, the tank includes an internal bladder 54 for physically isolating the primary fluid from the treatment fluid within the tank.

The fluid delivery system shown in FIG. 5 also includes a metering valve 56 interconnecting the tank outlet and the inlet port 38 to the pressure actuated valve 10. This metering valve 56 serves a dual purpose. Initially, it meters the amount of treatment fluid that is introduced through the pressure actuated valve 10 into the primary fluid supply line 40, and secondly, it decreases the rate of fluid flow through the metering valve so that flowing fluid back pressure will not keep the valve open inadvertently.

The pressurized treatment fluid tank 52 also includes an access opening covered by a fluid sealable cover or lid 58. Those skilled in the art will recognize that a back pressure relief-type valve as the control valve for fluid pressure into the tank bladder will permit the tank bladder pressure to exhaust when the valve is closed, thereby relieving the tank internal pressure and permitting the user to open the lid for replenishing the tank with treatment fluid or solution.

The manner of operation of the fluid delivery system of FIG. 5 is essentially identical to that of FIG. 4. Fluid pressure within the primary fluid supply line 40 upstream of the valve 48 pressurizes the tank internal bladder 54 within the pressurized tank 52. Treatment fluid within the tank 52, outside the bladder 54, is then indirectly pressurized and forced through the metering valve 56 and to the pressure actuated valve 10 at the second port 38. When the valve 48 is opened, flowing fluid back pressure within the primary fluid supply line 40 downstream of the valve 48 acts through the connecting pipe 50 into the valve 10 and against the valve element fluid pressure surface 36. When this fluid back pressure is sufficient to overcome the compressive force of the spring 22, the valve opens, establishing communication through the valve between the pressurized treatment fluid in the tank 52 and the primary fluid supply line 40. As long as this back pressure acting on the valve element fluid pressure surface 36 is maintained, the valve element will remain in its open position, permitting fluid flow from the higher pressure treatment fluid tank 52 through the valve and into the primary fluid supply line 40. When this back pressure acting on the valve element fluid pressure surface 36 drops below a predetermined minimum value, the compressive force of the spring 22 will overcome the force of such reduced fluid back pressure, causing the valve element to close, interrupting the communication between the treatment fluid tank and the primary fluid supply line. The valve 10 will thereafter remain in its closed position until sufficient flowing fluid back pressure acting on the valve element fluid pressure surface 36 again overcomes the force of the spring to shift the valve element into its valve open position.

Figure 6:
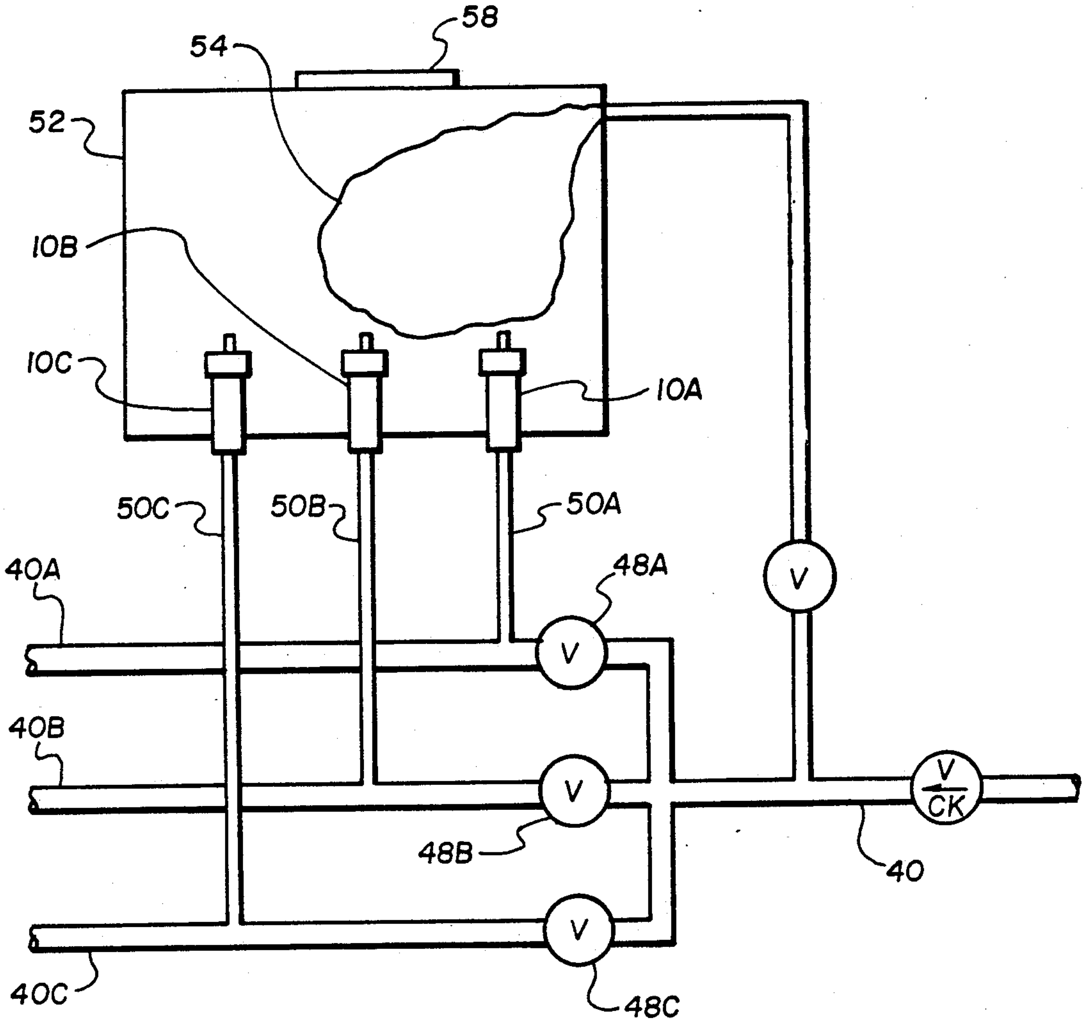
FIG. 6 is a schematic diagram similar to FIG. 5, showing a plurality of pressure actuated valves of the present invention utilized for introducing a treatment fluid from a bladder-type tank into a corresponding plurality of feeders from a primary fluid supply line.

FIG. 6 is a schematic diagram of a fluid delivery system essentially identical to that of FIG. 5, but including a plurality of feed lines 40A, 40B, 40C branching off of the variable pressure primary fluid supply line 40. Those skilled in the art will appreciate that the arrangement and operation of the system of FIG. 6 is identical to that of FIG. 5, and that the purpose of incorporating a plurality of primary fluid feed lines, in association with a corresponding number of pressure actuated valves 10A, 10B, 10C, and fluid feed line on/off valves 48A, 48B, 48C, is to provide a system whereby treatment fluid (e.g., liquid chemical) is delivered to only particular fluid feed lines 40A, 40B, 40C upon the occurrence of certain predetermined and independent feed line fluid back pressures. Additionally, those skilled in the art will immediately recognize that a system similar to that of FIG. 6 but incorporating a plurality of separate treatment fluid tanks could be utilized for supplying different treatment fluids to different primary fluid feed lines upon the occurrence of predetermined primary fluid feed line fluid flow back pressures acting on the individual pressure actuated valves.

From the foregoing it will be seen that this invention is one well adapted to attain all of the ends and objectives herein set forth, together with other advantages which are obvious and which are inherent to the apparatus. It will be understood that certain features and subcombinations are of utility and may be employed with reference to other features and subcombinations. This is contemplated by and is within the scope of the claims. As many possible embodiments may be made of the invention without departing from the scope of the claims. It is to be understood that all matter herein set forth or shown in the accompanying drawings is to be interpreted as illustrative and not in a limiting sense.

What is claimed is:

1. A fluid delivery system, comprising:

(a) a pressure actuated valve, comprising:

(i) a valve body having a bore therethrough defining an interior of said valve body;

(ii) a valve element positioned within said bore for movement therein;

(iii) a spring positioned within said bore to urge said valve element toward a valve closed position;

(iv) adjustment means mounted with said spring for permitting adjustment of spring force acting on said valve element;

(v) means defining a first port in said valve body for introducing a first pressurized fluid into said valve body interior to act against said valve element to open said valve element against the action of said spring; and (vi) means defining a second port in said valve body located such that (A) said spring causes said valve element to close communication between said second port and said valve body interior when the force of said spring is greater than the force of pressurized fluid at said first port, and (B) sufficient fluid pressure force at said first port to overcome the spring force will shift said valve element to open said second port to communication with said valve body interior;

(b) a primary fluid supply line in communication with said valve first port; and (c) a pressurized fluid supply line in communication with said valve second port, the fluid pressure within said pressurized fluid supply line being greater than the pressure within said primary fluid supply line, wherein a predetermined increase in pressure within said primary fluid supply line will overcome the spring force to cause said valve element to shift from its closed position to its open position, thereby establishing communication between said second port and said first port via said valve body interior, to permit the greater pressure pressurized fluid supply to flow through said second port, said valve interior, and said first port into said primary fluid supply line.

2. A fluid delivery system as set forth in claim 1, further comprising a metering valve between said pressurized fluid supply line and said pressure actuated valve for metering the flow of fluid from said pressurized fluid supply line into said valve.

3. A fluid delivery system as set forth in claim 1, wherein said pressurized fluid supply line is in communication with said primary fluid supply line upstream of the communication of said valve first port with said primary fluid supply line.

4. A fluid delivery system as set forth in claim 3, wherein said pressurized fluid supply line comprises a bladder-type tank having an inlet, and outlet, and a bladder therein for physically isolating fluid entering said inlet from fluid within said tank intended to exit said tank via said outlet.

* * * * *